March 26, 1968 J. J. VANDEMORE ETAL 3,375,378

PULSE FORMING CIRCUIT

Filed June 1, 1964 2 Sheets-Sheet 1

INVENTORS.
JAMES J. VANDEMORE &
MARVIN E. HINES
BY
Tilberry & Body
ATTORNEYS

March 26, 1968 J. J. VANDEMORE ET AL 3,375,378

PULSE FORMING CIRCUIT

Filed June 1, 1964 2 Sheets-Sheet 2

INVENTORS.
JAMES J. VANDEMORE &
MARVIN E. HINES
BY
Tilberry & Body
ATTORNEYS

United States Patent Office 3,375,378
Patented Mar. 26, 1968

3,375,378

PULSE FORMING CIRCUIT

James J. Vandemore, Geneseo, and Marvin E. Hines, East Moline, Ill., assignors, by mesne assignments, to E. W. Bliss Company, Canton, Ohio, a corporation of Delaware Filed June 1, 1964, Ser. No. 371,263
14 Claims. (Cl. 307—107)

ABSTRACT OF THE DISCLOSURE

A circuit for developing a single output pulse from an energy source, such as a battery, or an alternating current voltage source for application to an output circuit, such as a resistor or a pulse transformer, and including energy storage means, such as a capacitor. This circuit means further includes passive element steering circuit means, such as two electrode, unidirectional current passing diodes, for steering energy from the source to the capacitor, with the diodes being so arranged to bypass the output circuit. A capacitor discharge circuit is provided which includes at least a portion of the output circuit. A switching means is provided in a discharge circuit for purposes of closing the discharge circuit so that a single voltage pulse is obtained across the output circuit.

This invention relates to the art of pulse forming circuits and more particularly to a circuit for providing a single output pulse to an output circuit from an energy source.

The present invention is particularly applicable for providing a trigger pulse to control the operation of a solid state timer circuit, although it will be appreciated that it is not limited thereto and, for example, may be used for providing a trigger pulse for energizing a relay.

It has been determined in certain circuit environments, such as timer controls, that there is a need of circuit means which serve to supply a single trigger pulse to the control circuit of the timer, which pulse is not followed by a plurality of trailing pulses as is frequently common with pulse forming circuits. Such circuit means should respond to the establishment of a particular control condition to produce an output signal pulse which is nonrepetitive and its condition is abolished and only re-established when desired for the production of a second trigger signal pulse.

In accordance with the present invention, circuit means are provided for developing a single output trigger pulse from a source of energy. The circuit means includes energy storage means, steering circuit means for steering energy to the storage means, and switching means for switching the energy storage means across an output circuit to supply an output trigger pulse to the output circuit.

In accordance with another aspect of the present invention, the output circuit means takes the form of a transformer having a primary winding in circuit connection with the switching means, and a secondary winding adapted for circuit connection with utilization means.

In accordance with a still further aspect of the present invention, the output circuit may take the form of a resistive load in circuit connection with the switching means.

In accordance with a still further aspect of the invention, circuit means are provided for developing a single output pulse whether the source of energy be an alternating voltage source or a direct current voltage source.

The primary object of the present invention is to provide circuit means for developing a single output pulse from a source of energy which means is simple in construction and economical to manufacture.

Another object of the present invention is to provide circuit means for developing a single output pulse from either alternating voltage source or a direct current voltage source.

These and other objects and advantages of the invention will become apparent from the following description of the preferred embodiments of the invention as read in connection with the accompanying drawing in which.

Figure 1:
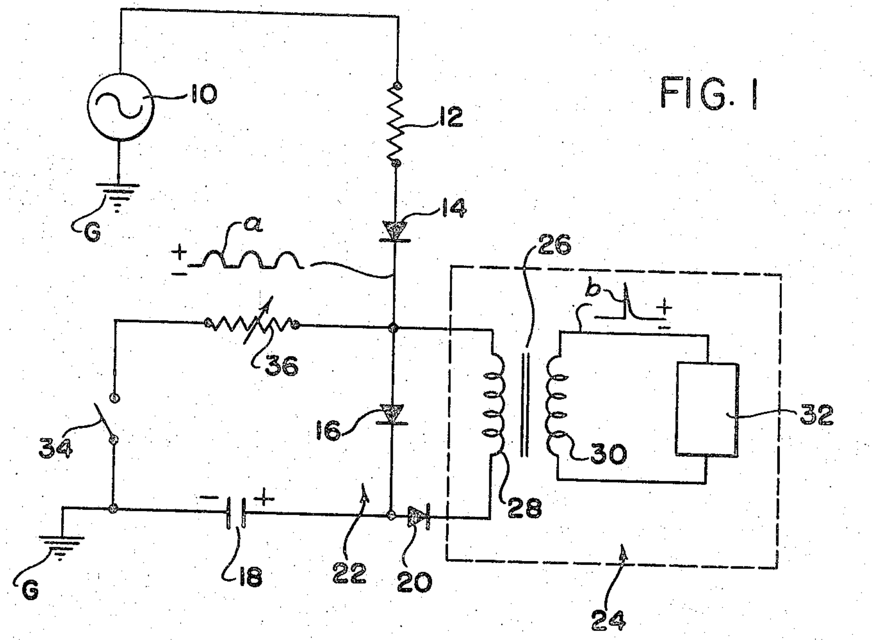
FIGURE 1 is a schematic circuit diagram illustrating one embodiment of the invention.

Referring now to FIGURE 1 there is illustrated an energy source taking the form of an alternating current voltage source 10 connected across a RC series circuit; including, a resistor 12, a rectifier diode 14, a steering diode 16, and a capacitor 18. As illustrated in the drawing, a common ground return path G may be provided between the alternating voltage source 10 and the capacitor 18 thereby eliminating the need for a separate return path conductor. Steering diode 16 together with a second steering diode 20 define a steering circuit 22 for purposes of steering rectified, positive voltage pulses from rectifier diode 14 to capacitor 18 to charge the capacitor. An output circuit 24, shown by the dotted lines in FIGURE 1, is connected across steering circuit 22 between steering diode 20 and the junction between steering diode 16 and the rectifier diode 14. The output circuit 24 includes a transformer 26 having a primary winding 28 and a secondary winding 30, which is in turn connected across suitable utilization means 32. A switch 34 is connected between the common ground G and the junction between rectifier diode 14 and steering diode 16 for purposes of discharging the capacitor 18 across the output circuit 24.

During operation of the circuit illustrated in FIGURE 1, current will flow from source 10 through resistor 12 and be rectified by diode 14 so as to obtain pulsating positive voltage pulses *a* on the cathode side of diode 14. Steering diode 20 of the steering circuit 22 serves to block current flow through the primary winding 28 of transformer 26 whereas steering diode 16 serves to direct positive current flow to the capacitor 18, which charges in accordance with the polarity indicated in FIGURE 1. Capacitor 18 will charge exponentially due to the RC time constant circuit which includes the capacitor 18, the forward resistance of steering diode 16, the forward resistance of rectifier diode 14 and the resistance of resistor 12. These components, i.e., resistor 12, diodes 14 and 16 and capacitor 18, are choosen to obtain a relatively short RC time constant. As no current is permitted to flow through the transformer primary winding 28 due to the high reverse resistance of diode 20 and the low forward resistance of diode 16, no output voltage pulse is induced in the secondary winding 30 of transformer 26.

Upon closure of switch 34 capacitor 18 will discharge through the circuit including steering diode 20, primary winding 28 of the transformer 26 and switch 34. This discharge is quite short in time since primary winding 28 is a low impedance transformer primary winding and diode 20 exhibits low forward resistance. The capacitor discharge current flow through primary winding 28 causes an output voltage pulse *b*, generally of the waveform as illustrated in FIGURE 1, to be induced across the secondary winding 30 of transformer 26 and thereby applied across the utilization means 32.

It will be appreciated from an examination of the circuit illustrated in FIGURE 1, in view of the foregoing description of operation, that the utilization means 32 is effectively isolated from the energy source 10. This follows since when switch 34 is open and capacitor 18 is being charged, no current flow is obtained through primary winding 28 and, hence, no voltage is induced across the secondary winding 30. Further, after capacitor 18 has discharged with the relatively short RC time constant provided by its discharge circuit, primary winding 28 is effectively short circuited due to the low forward resistance of the capacitor discharge circuit.

It will also be appreciated that whether switch 34 is momentarily closed or maintained closed to initiate discharge of capacitor 18, a single output voltage pulse will appear across the secondary winding 30 of transformer 26. Hence, it is not essential to the invention that switch 34 be maintained closed to completely discharge capacitor 18. If switch 34 is momentarily closed and thereafter opened so as to provide an induced voltage pulse across secondary winding 30, a succeeding pulse will not occur again until switch 34 is once more closed.

The output voltage pulse *b* illustrated in FIGURE 1 is shown as a positive pulse, although it will be appreciated that the polarity of the pulse may be either positive or negative in accordance with the desired transformer windings polarity relationship. It is also evident that if the polarity relationship of transformer windings 28 and 30 is such to obtain a positive pulse *b* with the circuit illustrated in FIGURE 1, a negative pulse will be obtained upon reversing the relationship of diodes 14, 16 and 20 so as to be poled opposite from that as illustrated in FIGURE 1.

The amplitude and width of the output pulse *b* may be varied as desired by means of a variable resistor 36 incorporated in the discharge circuit of capacitor 18. As shown in FIGURE 1, the variable resistor 36 is connected between the junction of the cathode of diode 14 and the anode of diode 16 and switch 34. An increase in the resistance of resistor 36 will result in a decrease in the amplitude of the output pulse *b* and an increase in the pulse width of the output pulse *b*. Conversely, a decrease in the resistance of resistor 36 will cause an increase in the amplitude of output pulse *b* and a decrease in the pulse width of output pulse *b*.

Figure 2:
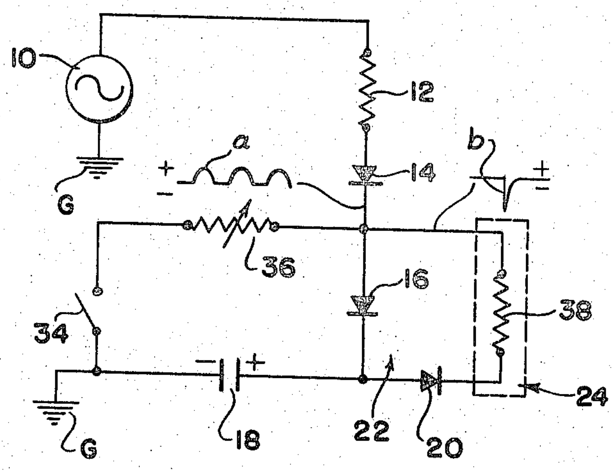
FIGURE 2 is a schematic circuit diagram illustrating a second embodiment of the invention.
Figure 3:
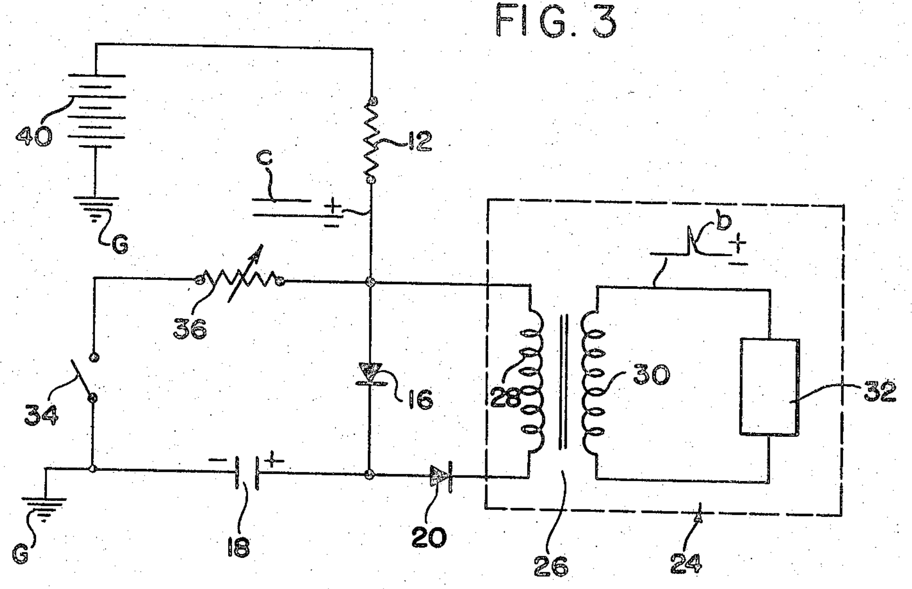
FIGURE 3 is a schematic circuit diagram illustrating a third embodiment of the invention.
Figure 4:
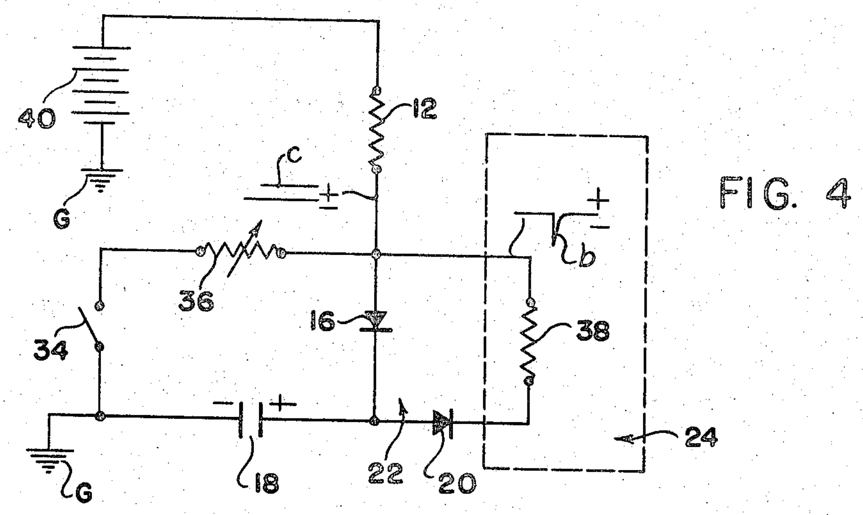
FIGURE 4 is a fourth embodiment according to the present invention.

Referring now to FIGURES 2, 3 and 4, there are illustrated three additional embodiments of the invention where for purposes of clarity like components are labeled with like character references relative to those in FIGURE 1.

The embodiment of the invention as illustrated in FIGURE 2 is quite similar to that as illustrated in FIGURE 1 and differs therefrom only in the output circuit 24. The output circuit 24 in FIGURE 2 takes the form of a resistive load 38 connected between the cathode of steering diode 20 and the junction between diodes 14 and 16. The operation of the circuit illustrated in FIGURE 2 is the same as that illustrated in FIGURE 1 and, accordingly, no further description is deemed necessary for a complete understanding of this invention; the operation differing essentially in that upon discharge of capacitor 18, current will flow through a capacitor discharge circuit including diode 20, load resistor 38, variable resistor 36 and switch 34. The amplitude and pulse width of output pulse *b* appearing across load resistor 38 will be determined by the values of the components in the capacitor discharge circuit of capacitor 18 in a manner similar to that as described with respect to FIGURE 1.

The embodiment of the invention illustrated in FIGURE 3 is quite similar to that illustrated in FIGURE 1 and differs therefrom in the choice of the energy source which takes the form of a direct current voltage source 40. Also, due to the choice of direct current voltage source 40, rectifier diode 14 illustrated in FIGURE 1 is eliminated from the circuit illustrated in FIGURE 3. The operation of the circuit illustrated in FIGURE 3 is quite similar to that of the circuit illustrated in FIGURE 1, except that a steady state, direct current voltage as shown by waveform *c* will exist on the output side of resistor 12 as distinguished from the pulsating waveform *a* illustrated in FIGURE 1. Capacitor 18 will charge in accordance with the polarity as indicated in the drawing. Upon closure of switch 34 the operation of the circuit illustrated in FIGURE 3 is identical with that illustrated in FIGURE 1 and, accordingly, no further description is deemed necessary for a complete understanding of the invention.

The embodiment of the invention as illustrated in FIGURE 4 is quite similar to that as illustrated in FIGURE 2 and differs therefrom only in the substitution of a direct current voltage source 40 for the alternating current voltage source 10 and that the rectifier diode 14 is eliminated in the circuit of FIGURE 4. During the operation of the circuit illustrated in FIGURE 4 a steady state, direct voltage as shown by waveform *c* will appear on the output side of resistor 12 and capacitor 18 will charge exponentially in the manner as described with respect to FIGURE 1 in accordance with the polarity indicated in the drawing. Upon closure of switch 34, capacitor 18 will discharge through the circuit including steering diode 20, load resistor 38, variable resistor 36 and switch 34. Accordingly, the output signal voltage shown by waveform *b* appearing across resistor load 38 will be a negative pulse as illustrated in FIGURE 4, similar to that obtained with the circuit illustrated in FIGURE 2.

The present invention has been described with reference to four particular embodiments of the inventive circuit, but is not limited to same. Various modifications may be made without departing from the scope and spirit of the present invention as defined by the appended claims.

We claim:

1. Circuit means for developing a single output pulse from an energy source for application to output circuit means and including energy storage means, an alternating current voltage source, passive element steering circuit means for steering energy from said voltage source to said storage means and so arranged to electrically bypass said output circuit means, said steering circuit means including only externally uncontrolled, two electrode unidirectional current passing elements, energy storage discharge circuit means including at least a portion of said output circuit means, and switching means in said discharge circuit means for closing said discharge circuit means whereby a single voltage pulse is obtained across said output circuit means.

2. Circuit means as set forth in claim 1, wherein said output circuit means included a transformer having a primary winding in circuit connection with said steering circuit means and a secondary winding adapted for circuit connection with utilization means.

3. Circuit means for developing a single output pulse from an energy source for application to output circuit means and including energy storage means, passive element steering circuit means for steering energy from said source to said storage means and so arranged to electrically bypass said output circuit means, said steering circuit means including only externally uncontrolled, two electrode unidirectional current passing elements, energy storage discharge circuit means including at least a portion of said output circuit means, switching means in said discharge circuit means for closing said discharge circuit means whereby a single voltage pulse is obtained across said output circuit means, said output circuit means includes a transformer having a primary winding in circuit connection with said steering circuit means and a secondary winding adapted for circuit connection with utilization means, and said steering circuit means includes first and second steering diodes, each having no more than two electrodes, said first steering diode connected in parallel with said primary winding and in series with said energy storage means in such a manner to provide a low resistance path from said source to said storage means, said second steering diode connected in series with said primary winding across said first steering diode and poled in an opposite sense from said first diode so as to present a high resistance path from said source to said storage means.

4. Circuit means as set forth in claim 3, wherein said energy storage discharge circuit means includes said second diode in series circuit with said primary winding and said switching means.

5. Circuit means for developing a single output pulse from an energy source for application to output circuit means and including energy storage means, passive element steering circuit means for steering energy from said source to said storage means and so arranged to electrically bypass said output circuit means, said steering circuit means including only externally uncontrolled, two electrode unidirectional current passing elements, energy storage discharge circuit means including at least a portion of said output circuit means, switching means in said discharge circuit means for closing said discharge circuit means whereby a single voltage pulse is obtained across said output circuit means, said output circuit means includes a transformer having a primary winding in circuit connection with said steering circuit means and a secondary winding adapted for circuit connection with utilization means, said steering circuit means includes first and second steering diodes, each having no more than two electrodes, said first steering diode connected in parallel with said primary winding and in series with said energy storage means in such a manner to provide a low resistance path from said source to said storage means, said second steering diode connected in series with said primary winding across said first steering diode and poled in an opposite sense from said first diode so as to present a high resistance path from said source to said storage means, said energy storage discharge circuit means includes said second diode in series circuit with said primary winding and said switching means, and said energy storage discharge circuit includes a variable resistor for varying the pulse width and amplitude of said output voltage pulse.

6. Circuit means as set forth in claim 3, including an energy storage charging circuit including said first steering diode in series circuit with said energy storage means across said energy source.

7. Circuit means as set forth in claim 6, wherein said energy source is a direct current voltage source.

8. Circuit means as set forth in claim 6, wherein said energy source is an alternating voltage source, and wherein rectifying means are provided in series circuit with said first steering diode and said energy storage means.

9. Circuit means as set forth in claim 1, wherein said output circuit means includes a resistive load in circuit connection with said steering circuit means.

10. Circuit means for developing a single output pulse from an energy source for application to output circuit means and including energy storage means, passive element steering circuit means for steering energy from said source to said storage means and so arranged to electrically bypass said output circuit means, said steering circuit means including only externally uncontrolled, two electrode unidirectional current passing elements, energy storage discharge circuit means including at least a portion of said output circuit means, switching means in said discharge circuit means for closing said discharge circuit means whereby a single voltage pulse is obtained across said output circuit means, said output circuit means includes a resistive load in circuit connection with said steering circuit means, and said steering circuit means includes first and second steering diodes, each having no more than two electrodes, said first steering diode connected in parallel with said resistive load and in series with said energy storage means in such a manner to provide a low resistance path from said source to said storage means, said second steering diode connected in series with said resistive load across said first steering diode and poled in an opposite sense from said first diode so as to present a high resistance path from said source to said storage means.

11. Circuit means for developing a single output pulse from an energy source for application to output circuit means and including energy storage means, passive element steering circuit means for steering energy from said source to said storage means and so arranged to electrically bypass said output circuit means, said steering circuit means including only externally uncontrolled, two electrode unidirectional current passing elements, energy storage discharge circuit means including at least a portion of said output circuit means, switching means in said discharge circuit means for closing said discharge circuit means whereby a single voltage pulse is obtained across said output circuit means, said output circuit means includes a resistive load in circuit connection with said steering circuit means, said steering circuit means includes first and second steering diodes, each having no more than two electrodes, said first steering diode connected in parallel with said resistive load and in series with said energy storage means in such a manner to provide a low resistance path from said source to said storage means, said second steering diode connected in series with said resistive load across said first steering diode and poled in an opposite sense from said first diode so as to present a high resistance path from said source to said storage means, and said energy storage discharge circuit includes a variable resistor for varying the pulse width and amplitude of said output voltage pulse.

12. Circuit means as set forth in claim 10, including an energy storage charging circuit including said first steering diode in series circuit with said energy storage means across said energy source.

13. Circuit means as set forth in claim 12, wherein said energy source is a direct current voltage source.

14. Circuit means as set forth in claim 12, wherein said energy source is an alternating voltage source, and wherein rectifying means are provided in series circuit with said first steering diode and said energy storage means.

References Cited

UNITED STATES PATENTS

| | | | |
|---|---|---|---|
| 2,507,226 | 5/1950 | Siezen | 328—67 |
| 3,090,017 | 5/1963 | Novic | 307—88.5 |
| 3,140,428 | 7/1964 | Shepard | 317—151 |
| 3,200,341 | 10/1965 | Reles | 320—1 |
| 3,211,984 | 10/1965 | Jones | 320—1 |
| 3,253,162 | 5/1966 | Barnes et al. | 307—88.5 |
| 3,289,064 | 11/1966 | Doyle et al. | 320—1 |
| 3,782,867 | 2/1957 | Hall | 307—108 |
| 3,066,260 | 11/1962 | Scoles et al. | 328—65 |
| 3,259,829 | 7/1966 | Feth | 320—1 |

LEE T. HIX, *Primary Examiner.*

D. F. DUGGAN, *Assistant Examiner.*